US011861878B2

(12) United States Patent
Gali et al.

(10) Patent No.: US 11,861,878 B2
(45) Date of Patent: Jan. 2, 2024

(54) VEHICULAR TRAILERING ASSIST SYSTEM WITH TRAILER CALIBRATION FEATURE

(71) Applicant: Magna Electronics Inc., Auburn Hills, MI (US)

(72) Inventors: Jyothi P. Gali, Rochester Hills, MI (US); Mohammadmehdi Jalalmaab, Waterloo (CA); Prasanna Ananthakrishnan, Tamilnadu (IN); Harold E. Joseph, Brampton (CA); Alexander Velichko, Toronto (CA)

(73) Assignee: Magna Electronics Inc., Auburn Hills, MI (US)

( * ) Notice: Subject to any disclaimer, the term of this patent is extended or adjusted under 35 U.S.C. 154(b) by 104 days.

(21) Appl. No.: 17/443,258

(22) Filed: Jul. 23, 2021

(65) Prior Publication Data

US 2022/0028111 A1    Jan. 27, 2022

Related U.S. Application Data

(60) Provisional application No. 62/705,968, filed on Jul. 24, 2020.

(51) Int. Cl.
| | |
|---|---|
| G06V 10/44 | (2022.01) |
| G06T 7/73 | (2017.01) |
| H04N 7/18 | (2006.01) |
| B60R 1/00 | (2022.01) |
| B62D 13/00 | (2006.01) |
| G06V 10/75 | (2022.01) |
| G06V 20/56 | (2022.01) |

(52) U.S. Cl.
CPC .............. *G06V 10/44* (2022.01); *B60R 1/003* (2013.01); *B62D 13/00* (2013.01); *G06T 7/74* (2017.01); *G06V 10/751* (2022.01); *G06V 20/56* (2022.01); *H04N 7/18* (2013.01); *G06T 2207/30252* (2013.01)

(58) Field of Classification Search
CPC ........ G06T 7/74; G06V 10/751; G06V 10/44; G06V 20/56; B60R 1/003; B62D 13/00; H04N 7/18
See application file for complete search history.

(56) References Cited

U.S. PATENT DOCUMENTS

| | | | |
|---|---|---|---|
| 6,690,268 | B2 | 2/2004 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |

(Continued)

*Primary Examiner* — Rowina J Cattungal
(74) *Attorney, Agent, or Firm* — HONIGMAN LLP

(57) ABSTRACT

A vehicular trailer assist system includes a camera disposed at a vehicle and viewing at least a portion of a trailer hitched to the vehicle. A control, responsive to processing of frames of image data captured by the camera and during a calibration maneuver by the vehicle, determines an initial trailer template of trailer hitched to the vehicle. During a turning portion of the calibration maneuver, a subset of frames of image data is stored, each stored frame of image data including the trailer at a different trailer angle relative to a longitudinal axis of the vehicle. The control, responsive to storing the subset of frames of image data, converts each stored frame of image data to an edge image and matches each edge image to the determined initial trailer template, and determines a location of a hitch ball of the vehicle.

20 Claims, 13 Drawing Sheets

(56) References Cited

U.S. PATENT DOCUMENTS

| | | |
|---|---|---|
| 9,085,261 B2 | 7/2015 | Lu et al. |
| 9,446,713 B2 | 9/2016 | Lu et al. |
| 9,558,409 B2 | 1/2017 | Pliefke et al. |
| 9,937,953 B2* | 4/2018 | Lavoie .................. B60D 1/245 |
| 10,071,687 B2 | 9/2018 | Ihlenburg et al. |
| 10,086,870 B2 | 10/2018 | Gieseke et al. |
| 10,099,614 B2 | 10/2018 | Diessner |
| 10,160,382 B2 | 12/2018 | Pliefke et al. |
| 10,532,698 B2 | 1/2020 | Potnis et al. |
| 10,552,976 B2 | 2/2020 | Diessner et al. |
| 10,586,119 B2 | 3/2020 | Pliefke et al. |
| 10,638,025 B2 | 4/2020 | Gali et al. |
| 10,706,291 B2 | 7/2020 | Diessner et al. |
| 10,733,757 B2 | 8/2020 | Gupta et al. |
| 10,755,110 B2 | 8/2020 | Bajpai |
| 10,780,752 B1* | 9/2020 | Niewiadomski ......... B60D 1/62 |
| 2014/0085472 A1 | 3/2014 | Lu et al. |
| 2014/0160276 A1 | 6/2014 | Pliefke et al. |
| 2015/0002670 A1 | 1/2015 | Bajpai |
| 2015/0217693 A1 | 8/2015 | Pliefke et al. |
| 2017/0050672 A1 | 2/2017 | Gieseke et al. |
| 2017/0174128 A1* | 6/2017 | Hu ........................... G06T 7/74 |
| 2017/0254873 A1 | 9/2017 | Koravadi |
| 2017/0341583 A1* | 11/2017 | Zhang ...................... B60R 1/00 |
| 2018/0215382 A1 | 8/2018 | Gupta et al. |
| 2018/0253608 A1 | 9/2018 | Diessner et al. |
| 2018/0276838 A1 | 9/2018 | Gupta et al. |
| 2018/0276839 A1 | 9/2018 | Diessner et al. |
| 2019/0016264 A1 | 1/2019 | Potnis et al. |
| 2019/0039649 A1 | 2/2019 | Gieseke et al. |
| 2019/0042864 A1 | 2/2019 | Pliefke et al. |
| 2019/0064831 A1 | 2/2019 | Gali et al. |
| 2019/0118860 A1 | 4/2019 | Gali et al. |
| 2019/0143895 A1 | 5/2019 | Pliefke et al. |
| 2019/0297233 A1 | 9/2019 | Gali et al. |
| 2019/0347825 A1 | 11/2019 | Gupta et al. |
| 2020/0017143 A1 | 1/2020 | Gali |
| 2020/0282910 A1* | 9/2020 | Nagasamy ............. B60D 1/245 |
| 2020/0334475 A1 | 10/2020 | Joseph et al. |
| 2020/0356788 A1 | 11/2020 | Joseph et al. |
| 2020/0361397 A1 | 11/2020 | Joseph et al. |
| 2020/0406967 A1 | 12/2020 | Yunus et al. |
| 2022/0027644 A1 | 1/2022 | Gali et al. |
| 2022/0028111 A1 | 1/2022 | Gali et al. |

* cited by examiner

VEHICULAR TRAILERING ASSIST SYSTEM WITH TRAILER CALIBRATION FEATURE

CROSS REFERENCE TO RELATED APPLICATION

The present application claims the filing benefits of U.S. provisional application Ser. No. 62/705,968, filed Jul. 24, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

The present invention provides a trailer assist system for a vehicle that includes a camera disposed at a rear portion of a vehicle equipped with the vehicular trailering assist system. The camera views at least rearward of the vehicle. With a trailer hitched to the vehicle via a pivoting joint hitch connection of the trailer to the vehicle, the camera views at least a portion of the trailer hitched to the vehicle. The camera captures frames of image data that include image data representative of at least a portion of the trailer hitched to the vehicle. The system includes an electronic control unit (ECU) with electronic circuitry and associated software. The electronic circuitry includes an image processor operable to process frames of image data captured by the camera as the vehicle and trailer travel along a road. The ECU, responsive to processing of frames of image data captured by the camera during a calibration maneuver by the vehicle, determines an initial trailer template of the trailer hitched to the vehicle. The ECU, during a turning portion of the calibration maneuver, and at least in part via processing of frames of image data captured by the camera during the turning portion of the calibration maneuver, stores a portion or subset of the frames of image data captured by the camera. Each stored frame of image data of the stored portion or subset includes the trailer at a different trailer angle relative to a longitudinal axis of the vehicle. The ECU, responsive to capturing the series of frames of image data, determines image data edges for each stored frame of image data image data. The ECU, responsive to determining image data edges for each stored frame of image data, matches each determined image data edge to the determined initial trailer template. The ECU, responsive to matching each determined image data edge to the determined initial trailer template, determines a location of a hitch ball of the vehicle.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or trailering assist system and/or driving assist system operates to capture images exterior of the vehicle and a trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward (or forward) direction. The system includes an image processor or image processing system that is operable to receive image data from one or more cameras and may provide an output to a display device for displaying images representative of the captured image data. Optionally, the system may provide a rearview display or a top down or bird's eye or surround view display or the like.

Figure 1:
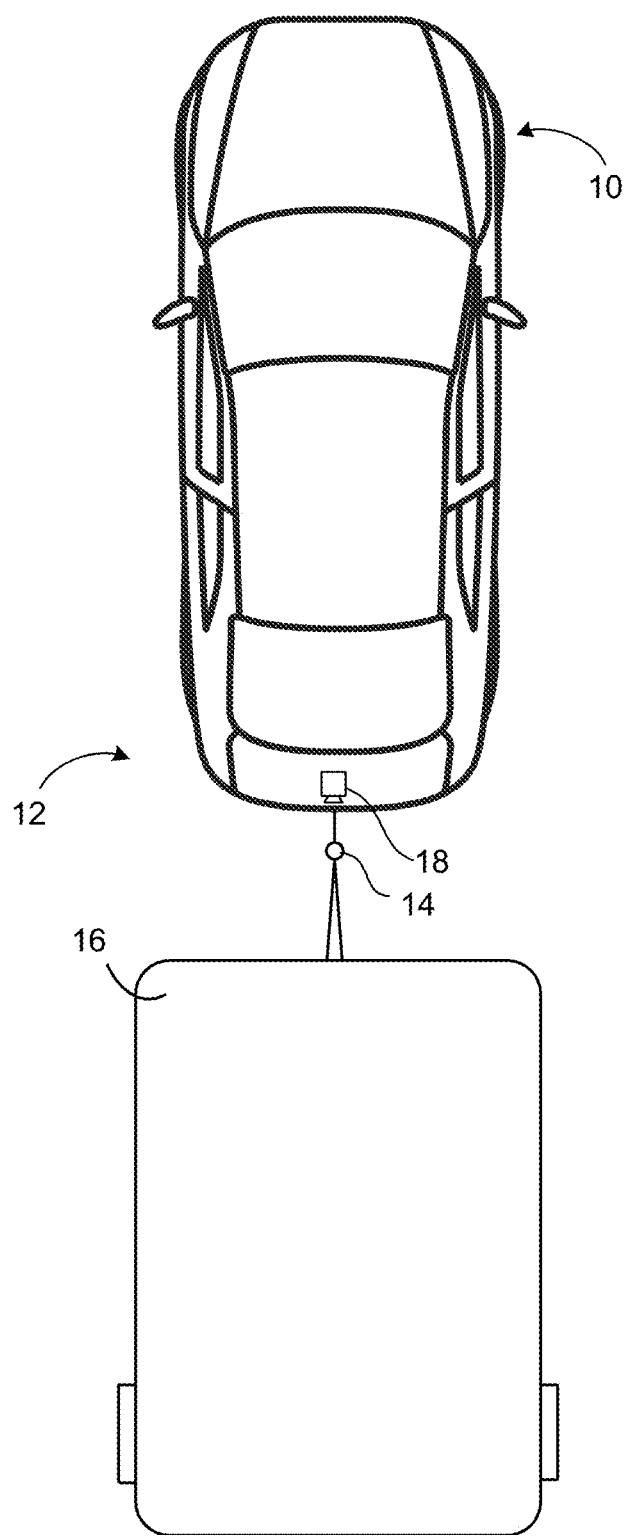
FIG. 1 is a plan view of a vehicle with a trailer assist system that is operable to steer a trailer along a trailer direction.

Referring now to the drawings and the illustrative embodiments depicted therein, a vehicle 10 includes a trailer assist system 12 that is operable to assist in backing up or reversing the vehicle with a trailer hitched to the vehicle via, for example, a hitch 14, and that may maneuver the vehicle 10 and trailer 16 toward a desired or selected location. The trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior of the vehicle 10, which includes the hitch 14 and/or trailer 16, with the camera 18 having a lens for focusing images at or onto an imaging array or imaging plane or imager of the camera (FIG. 1). The imager comprises an imaging array of rows and columns of photosensing elements. Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control or electronic control unit (ECU) or processor that is operable to process image data captured by the camera or cameras and may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

Trailer calibration is an important step in understanding and recognizing the features and aspects of a trailer hitched to a towing vehicle. The recognized features/aspects may be stored in memory of the vehicle and recalled and used in other trailering applications to provide, for example, smooth operation of the trailer.

Figure 2:
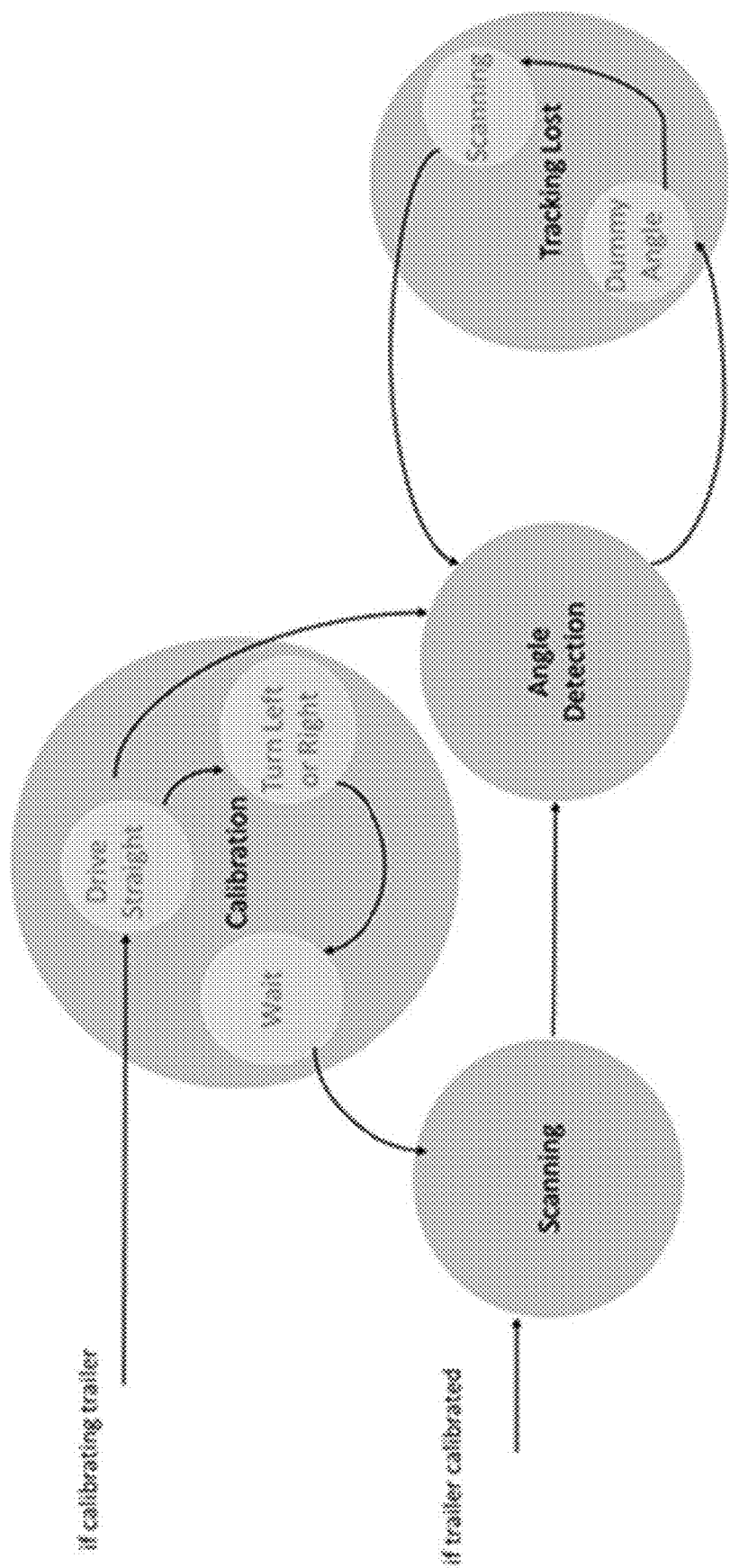
FIG. 2 is a schematic view of different states of the trailer assist system.

Referring now to FIG. 2, a trailer assist system for a vehicle includes performing trailer angle detection (TAD) and performing calibration of the system for the particular trailer hitched to the vehicle. During calibration, the system determines a number of important features of the trailer. For example, the system captures features of the hitched trailer and estimates the trailer hitch position. The system may also determine the jack-knife angle of the trailer (i.e., the trailer angle at which the trailer is in danger of jack-knifing), estimate a beam length of the trailer, and/or determine a trailer collision angle (i.e., the trailer angle at which the trailer is in danger of colliding with the towing vehicle). The trailer assist system may utilize aspects described in U.S. provisional applications, Ser. No. 62/705,966, filed Jul. 24, 2020 and titled VEHICULAR TRAILERING ASSIST SYSTEM WITH TRAILER COLLISION ANGLE DETECTION, and/or Ser. No. 62/705,967, filed Jul. 24, 2020 and titled VEHICULAR TRAILERING ASSIST SYSTEM WITH HITCH BALL DETECTION, which are hereby incorporated herein by reference in their entireties.

The system provides an optimal calibration drive where all calibration features of the hitched trailer are determined, detected, and/or estimated. Different features are determined at various positions of the calibration drive or maneuver as each feature may exhibit a variety of characteristics during the ride, which may otherwise cause estimation of the feature to be difficult. The event-based optimal calibration drive described herein may cover all features prior to completion of the calibration.

As illustrated in the state diagram of FIG. 2, the system may include three primary states: a calibration state, a scanning state, and an angle detection state. Optionally, the calibration state only occurs (i.e., the system only performs calibration) when a new trailer is introduced to the system. A new trailer is defined as any trailer not previously hitched to the vehicle or calibrated by the system. For example, the operator may indicate to the system (via, for example, a user-actuatable input such as a touchscreen display disposed within the vehicle or the like) that a new trailer is hitched to the vehicle and the system should enter calibration. Alternatively, the system may determine that the hitched trailer is new (e.g., via processing of image data captured by the rear-viewing camera or data from other sensors). When a previously calibrated trailer is hitched to the vehicle, the system may automatically detect that trailer or alternatively the operator may select that trailer from a set of stored trailer profiles (i.e., stored on non-volatile memory disposed within the vehicle). Thus, the system may recall parameters for a previously calibrated trailer without the need to calibrate the trailer a second time. Optionally, the user may force (e.g., via actuation of a user input) the system to perform a recalibration to replace current calibration values.

After calibration, the system enters the scanning state and/or the angle detection state. During the scanning state, the system determines an initial angle of the hitched trailer relative to the vehicle and transitions to the angle detection state. From the angle detection state, the system may transition to a tracking lost state, which, as discussed in more detail below, includes a scanning sub-state and a dummy angle sub-state.

Figure 3:
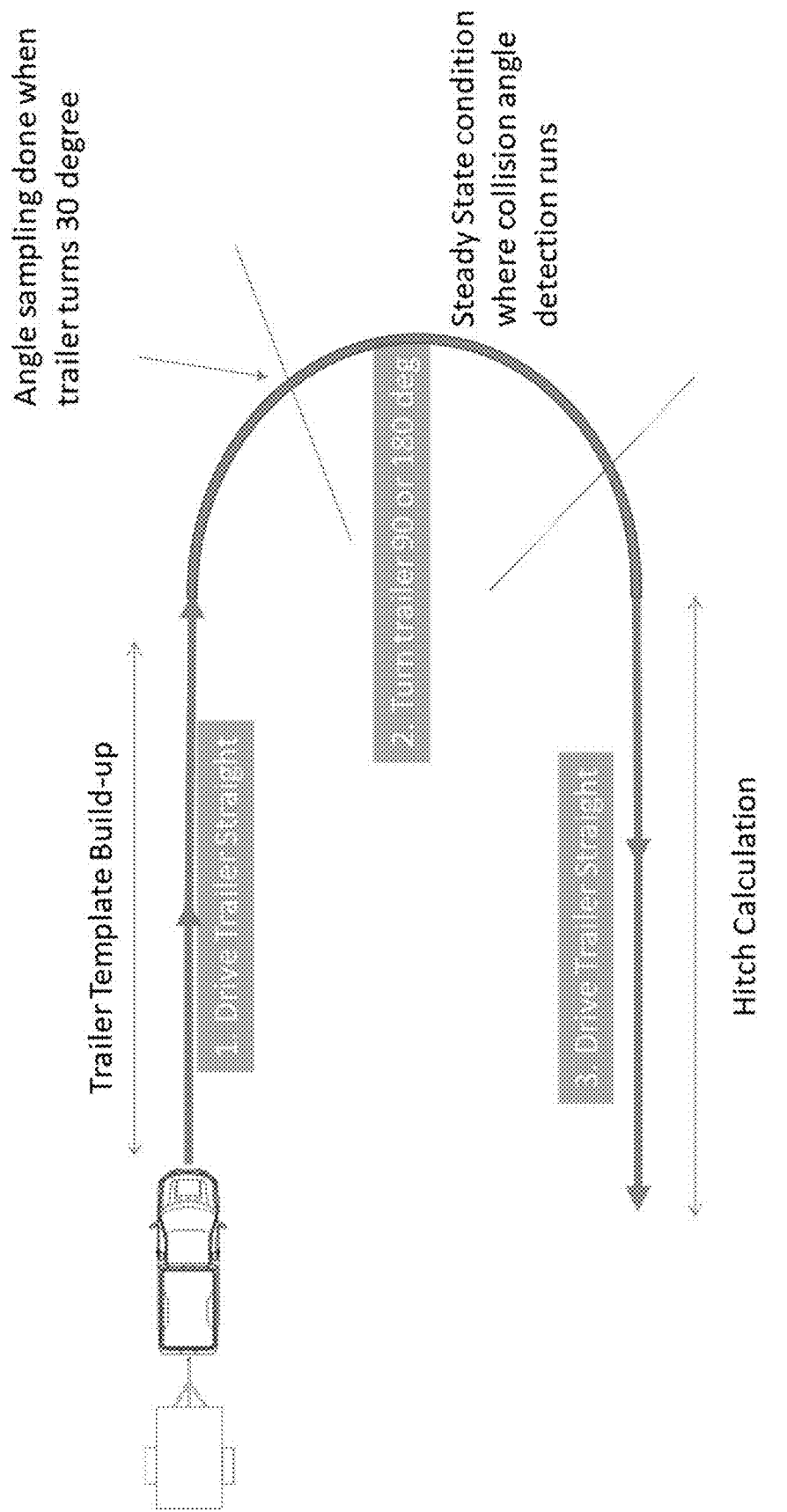
FIG. 3 is a schematic view of a calibration maneuver used by the trailer assist system.

Referring now to FIG. 3, the calibration state performs three primary functions: trailer calibration, hitch ball detection, and collision angle detection. During calibration, the vehicle operator (or the vehicle when operating autonomously or semi-autonomously operation) drives the towing vehicle straight for a threshold distance before turning the vehicle left or right sharply. The system may perform trailer calibration, hitch ball detection, and collision angle detection sequentially. For example, each of these algorithms may be performed in a sub-state of the calibration state. The sub-states may include a drive straight sub-state, a turn left/right sub-state, and a please wait sub-state. Once the particular algorithm has completed (i.e., trailer calibration, hitch ball detection, or collision angle detection), the system automatically transitions to the next sub-state.

Figure 4:
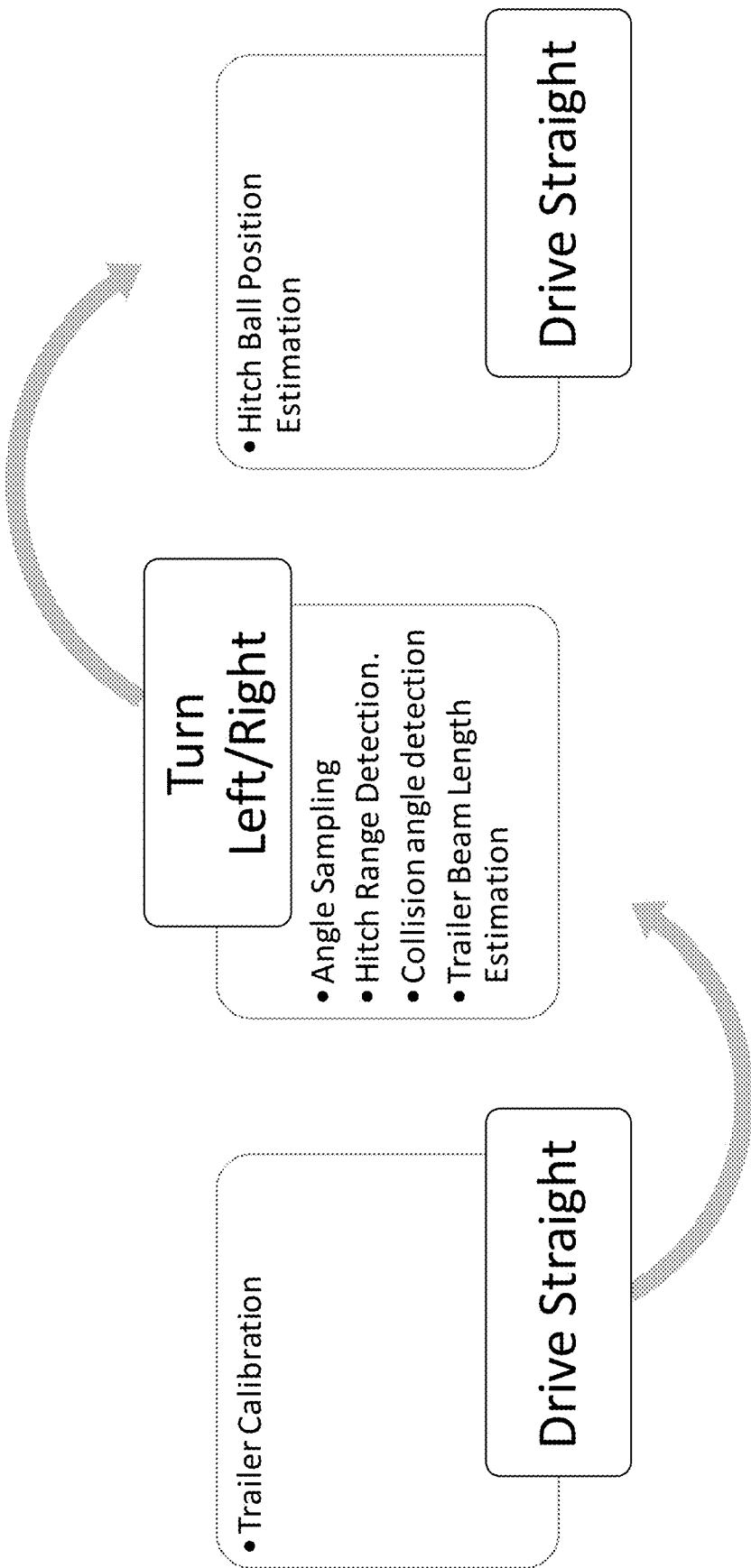
FIG. 4 is a schematic view of a block diagram of different sub-states of a calibration state.

As illustrated in FIGS. 3 and 4, during calibration, the vehicle, when calibrating a new trailer, performs a calibration maneuver. The calibration maneuver or drive involves the towing vehicle driving in a straight line (i.e., with a zero or near zero steering wheel angle) for a threshold distance and/or at a threshold speed for a threshold period of time prior to making a turn (e.g., a 90 degree turn or a 180 degree turn such as a U-turn to the left or right). After completing the turn, the vehicle again drives in a straight line forward. Different portions of the calibration maneuver may be used to perform different aspects of the trailer assist system. For example, as illustrated in FIG. 4, trailer calibration may be performed during a first drive straight portion. Angle sampling, hitch range detection, and collision angle detection may be performed during the turn left/right portion (i.e., a U-turn). The hitch ball calculation may be performed during the final drive straight portion.

During the first portion of the calibration maneuver, the system may operate in the drive straight sub-state. In this state, a kinematic model begins providing approximate trailer angles (i.e., the angle of the trailer relative to the vehicle) based on, for example, the steering wheel angle of the towing vehicle and speed of the towing vehicle. The initial trailer angle is helpful to determine or estimate when or whether the trailer angle has become zero degrees (i.e., the trailer is in-line with the towing vehicle). During the calibration maneuver, the system may process a series of frames of image data. Each frame of image data in the series is captured at a point in time after the previous frame in the series. That is, the first frame of image data in the series is captured at the earliest point in time of all of the frames of image data in the series and the last frame of image data in the series is captured at the latest point in time of all the frames of image data in the series. The series of frames of image data may include consecutive frames of image data captured by the camera or instead may "skip" any number of frames in between. For example, the system may process every fifth frame or every tenth frame or the like. Once the system determines that the trailer angle during the first straight portion of the calibration maneuver is zero or approximately zero, a trailer calibration algorithm may begin processing canny edges of frames of image data captured by the rear-view camera (e.g., top view images that include at least a portion of the trailer hitch).

Figure 5A:
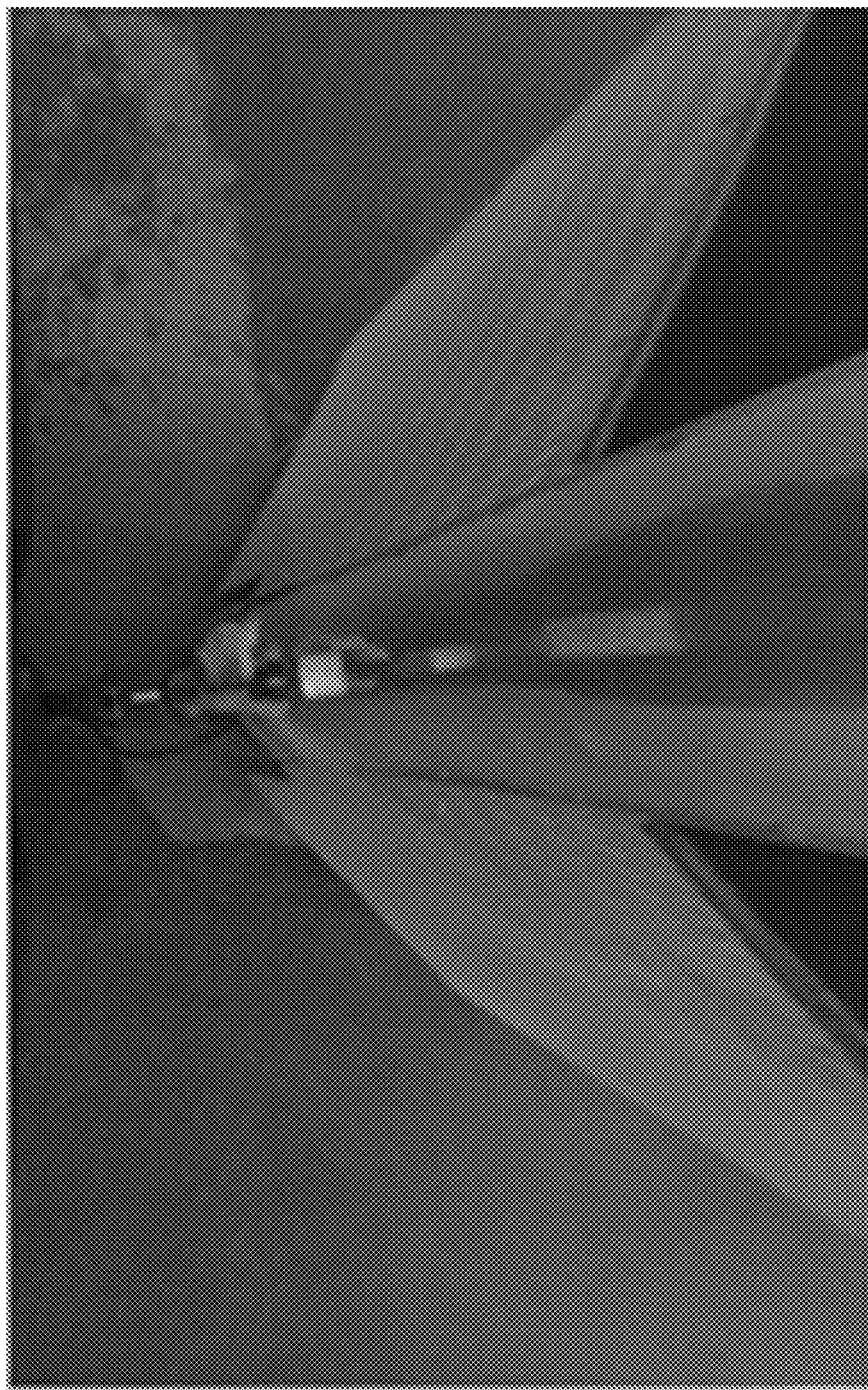
FIGS. 5A-5C are an exemplary frame of image data cropped and converted into an edge frame.
Figure 5B:
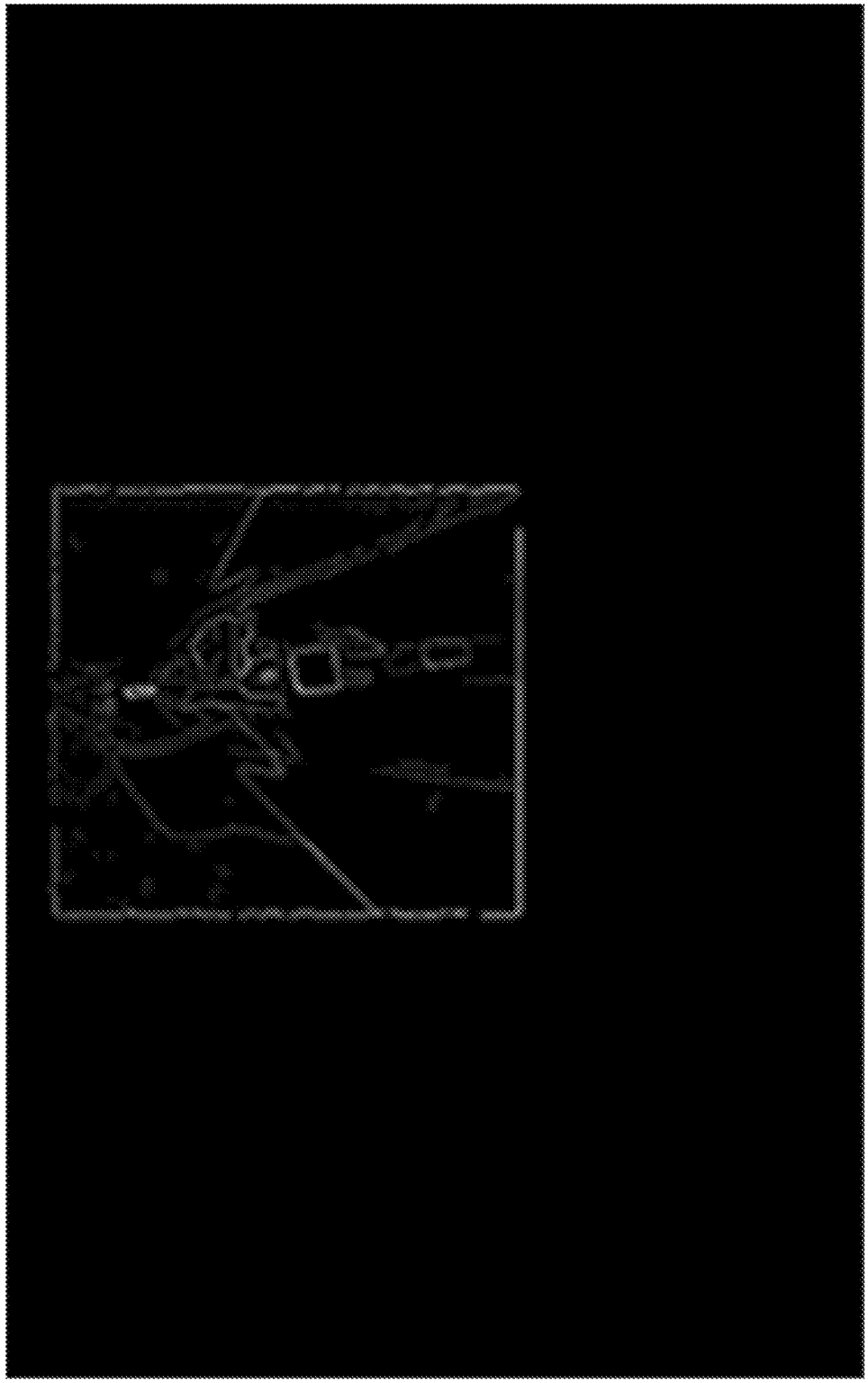
Figure 5C:

Optionally, the system processes a frame of image data to convert the frame to an edge image. For example, FIG. 5A illustrates an exemplary frame of top-view image data and FIG. 5B illustrates a corresponding edge image of the frame of FIG. 5A. The edge image may remove all content from the image data other than detected edges (e.g., canny edges). The edge image may be provided to the trailer calibration module for processing. The system may process only a portion of the image data for edge detection and transmit only that portion to the trailer calibration algorithm. For example, a size of the original input top view image may be 640 pixels by 400 pixels while a region of interest (e.g., a portion of the hitch including the hitch ball) may be, for example, 201 pixels by 221 pixels. As illustrated in FIG. 5B, the system may crop the image prior to or after performing the edge detection. That is, as shown in FIG. 5B, the system may crop or otherwise remove portions of the frame of image data and/or edge image. FIG. 5C illustrates an example of the edge image after cropping where only the region of interest remains.

After completing the initial drive straight portion of the calibration maneuver, the system may enter the turn left/right sub-state where the operator or system begins a turn such as a U-turn to either the right or the left. Once in this sub-state, the system determines a dummy trailer angle based on an assumed hitch point. The system, at this point in calibration, uses this rough estimation as the initial trailer angle.

During this sub-state, the system determines whether the hitch ball has been detected. When the hitch ball has not yet been detected, the system begins an angle sampling algorithm. This algorithm stores a captured image of the trailer and/or trailer hitch into vehicle memory. The system uses the kinematic model as an angle reference. The system may periodically store a frame of image data. For example, the system may store consecutive frames of image data or skip any number of frames of image data between storing another frame. Once the kinematic model reaches, for example, 25 degrees, the system halts collection of image data and transitions to the please wait sub-state.

Figure 6:
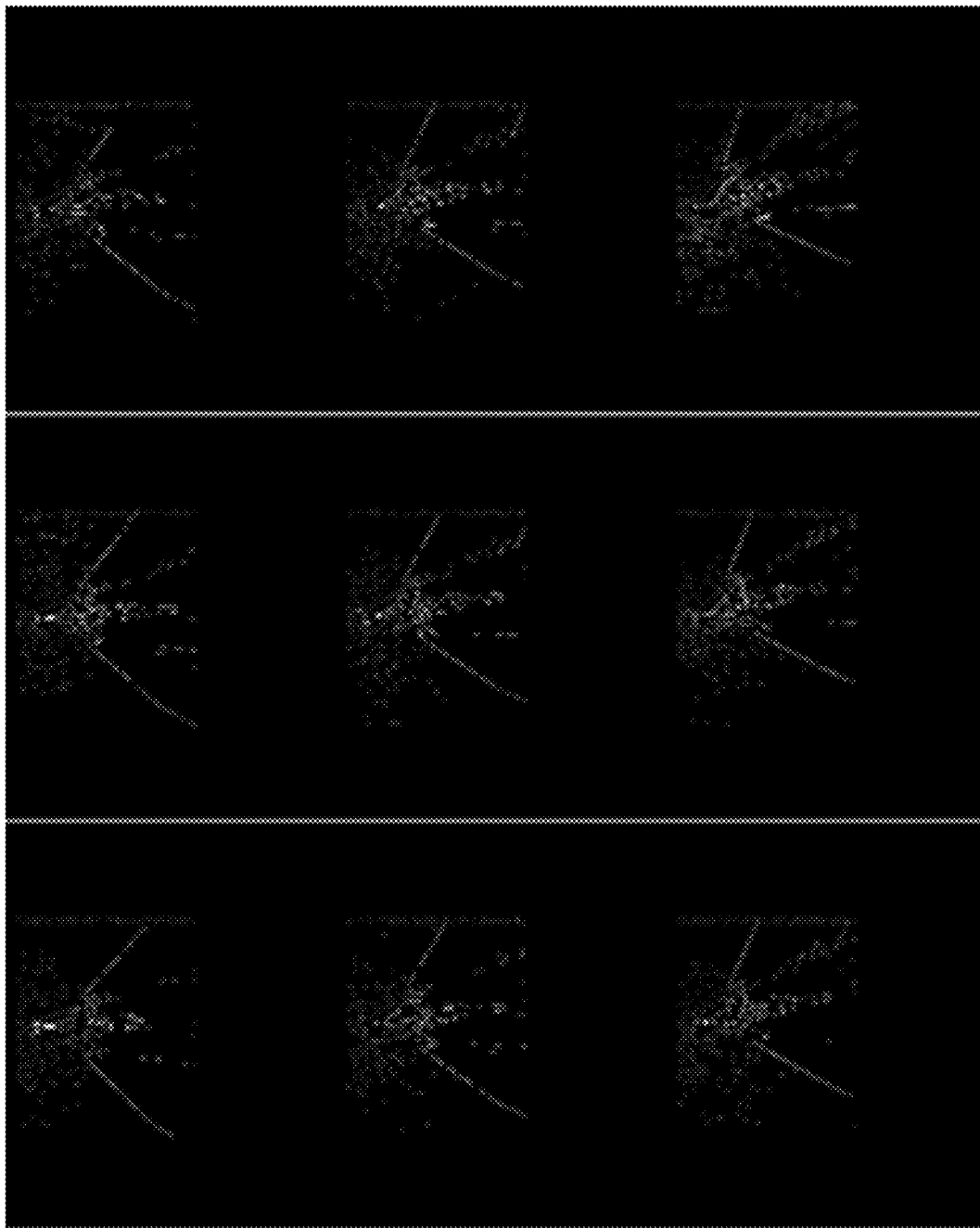
FIG. 6 is a schematic view of nine edge images captured at different trailer angles.

During the next state (e.g., the please wait sub-state), the system provides the collected image data (e.g., a plurality of frames of images data) to a hitch ball detection module. Optionally, a total of nine stored images, each captured at a different point during the calibration turn and thus each at a different trailer angle, is transmitted to the hitch ball detection module (e.g., the images captured until the vehicle performed a threshold portion of the turn, such as 25 degrees or 30 degrees). Each frame of image data may be captured and/or stored at any resolution. For example, the frames of image data may have a resolution of 640×400. FIG. 6 illustrates an example of nine frames of image data, each converted to an edge image frame (and optionally cropped) and each captured when the trailer angle was a different value from each other frame of captured image data.

In addition to angle sampling, the hitch range detection algorithm determines a hitch range (i.e., a range in the image data where hitch is likely located). Once the hitch range detection and angle sampling is complete, a collision angle algorithm determines a collision angle (i.e., the trailer angle that would result in the towing vehicle colliding with the trailer).

Figure 7:
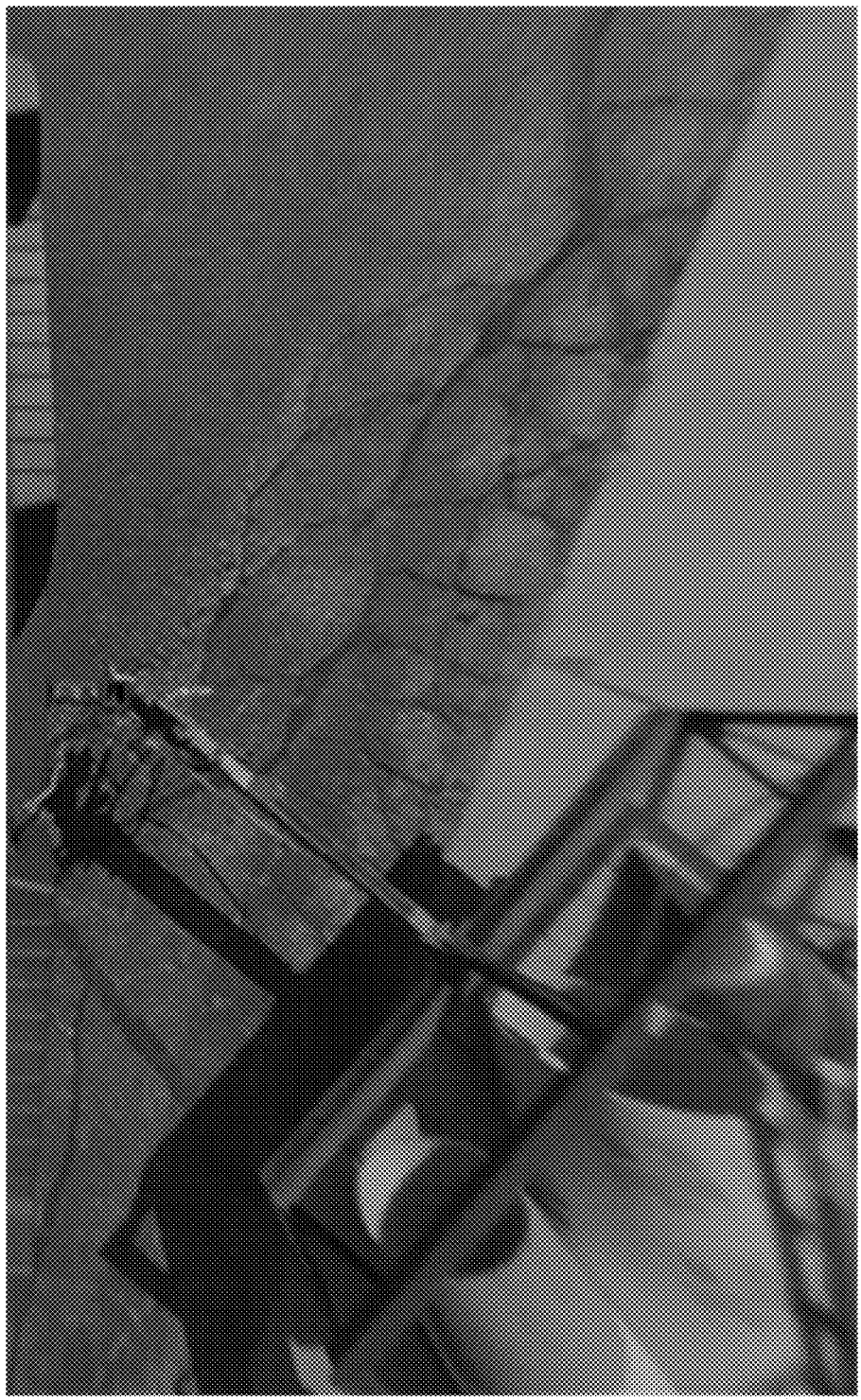
FIG. 7 is an exemplary frame of image data captured during a steady state portion of the calibration maneuver.

To determine the collision angle, the system may require that the trailer angle is in a steady state condition while the vehicle is moving (i.e., the background is moving). For example, after a first portion of the turn of the calibration maneuver (e.g., 30 degrees), the trailer will turn at the same rate as the vehicle and the trailer angle will remain constant until the vehicle begins straightening out from the turn. FIG. 7 illustrates an exemplary frame of image data captured while the trailer angle is steady (i.e., constant) during a portion of the turn of the calibration maneuver. The collision angle module may determine an edge hit rate during this process to obtain a boundary of the trailer. The system may determine the collision angle based on the determined boundary of the trailer relative to the rear bumper or rear portion of the vehicle that is present in the top down field of view of the camera and is distorted or curved due to the wide angle lens of the camera (e.g., a banana view).

Figure 8:
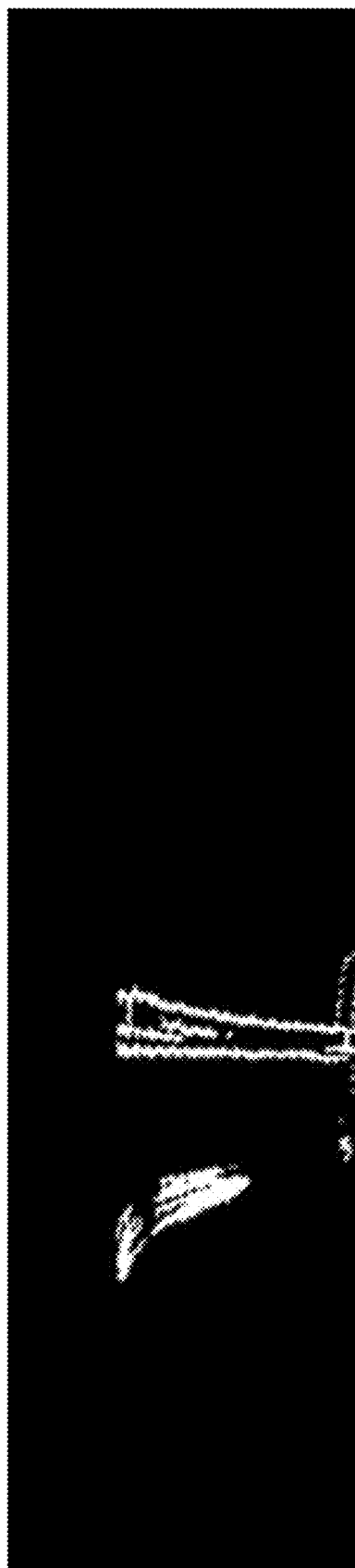
FIG. 8 is a schematic view of a final edge image.

Referring now to FIG. 8, the final edge frame of image data may only contain trailer regions. The system may calculate this final edge frame of image data by adding a hit rate for a series of, for example, 30 frames. Once the final edge is calculated, the system may detect or determine the boundary of the trailer/hitch using profiling. From this profile, the system may select the nearest trailer position from the dummy angle position as a suitable candidate and subsequently convert the dummy angle to a trailer angle.

Next, the system transitions to the please wait sub-state. In this state, the dummy angle is provided with the assumed hitch position. The system may provide the input images from the angle sampling to a hitch ball detection algorithm. In order to provide the hitch ball detection algorithm with adequate processing time and data, the algorithm may process or execute in a part time manner over, for example, 16 frames of captured image data. During this portion, the system may display a notification to the driver via, for example, a display disposed within the vehicle. For example, the system may display a "Please Wait" notification. During this portion, the input frames of image data captured while the trailer angle was constant or steady (e.g., the nine input images) are processed in a sequential manner.

Figure 9:
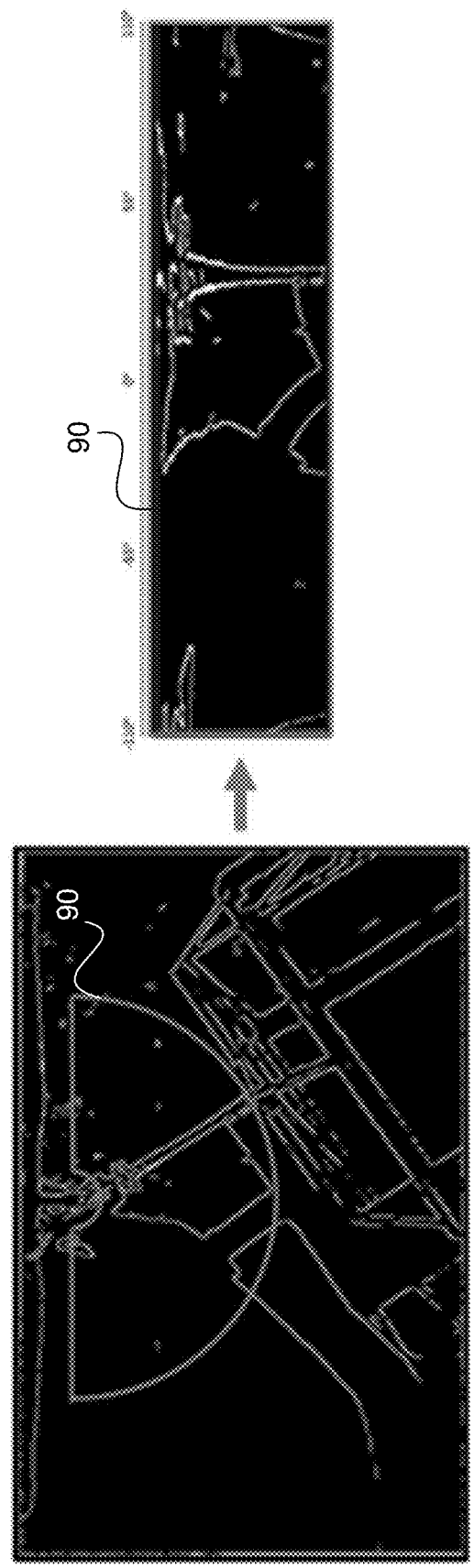
FIG. 9 is a schematic view of warping a region of interest of an edge image.
Figure 10:
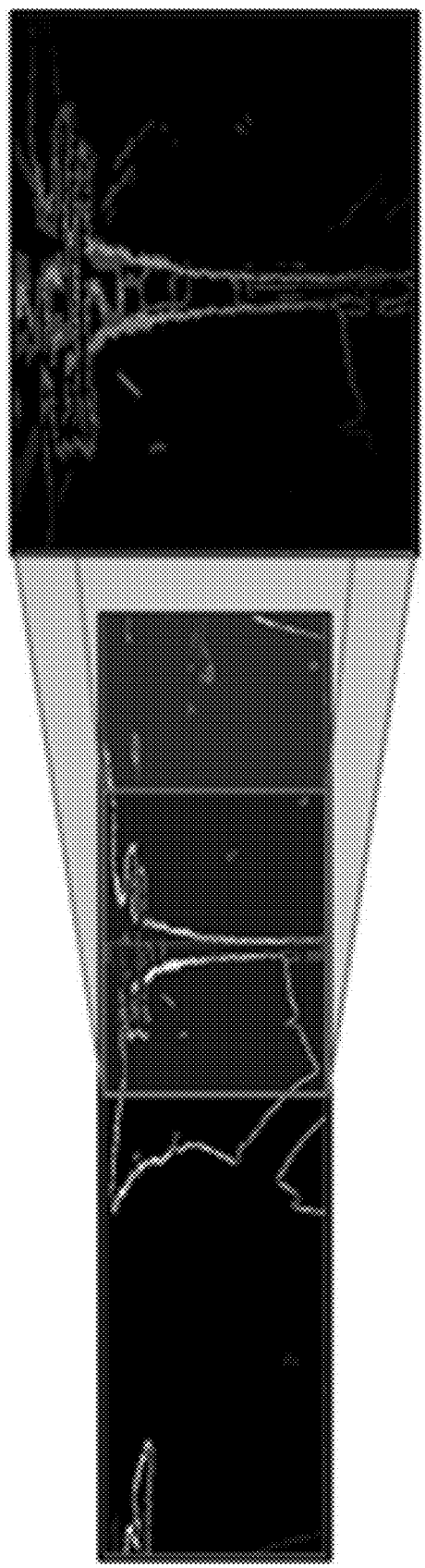
FIG. 10 is a schematic view of matching a warped region of interest with a trailer template.
Figure 11:
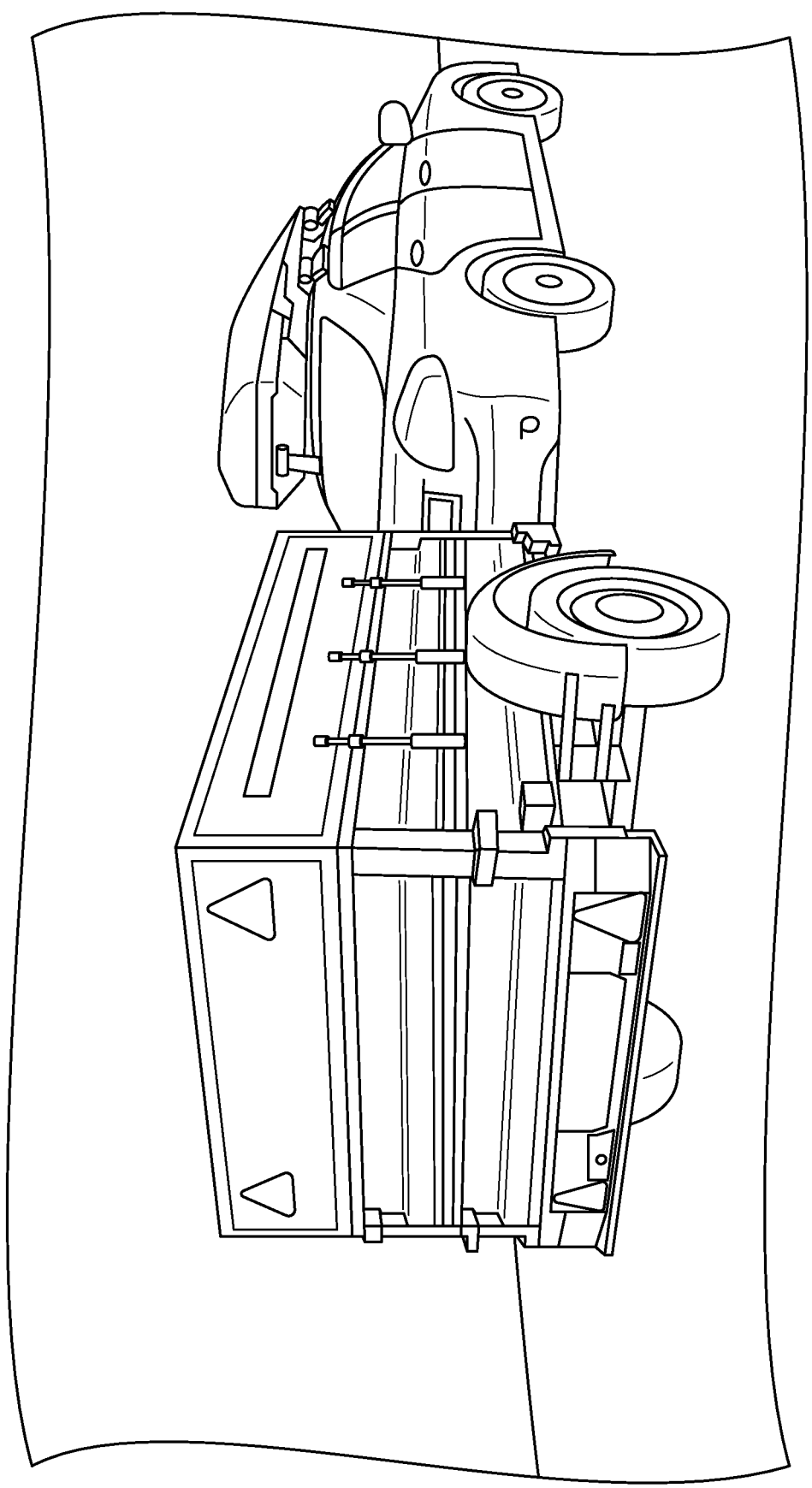
FIG. 11 is a perspective view of a towing vehicle towing a trailer.

Referring now to FIG. 9, the system initially processes a single image and warps a specific region of interest 90 into a separate image. The warped image (illustrated on the right in FIG. 9) may have any resolution, such as, for example, 640×150. The system may also warp, crop, and/or resize the calibration template (e.g., to a size of 203×150 pixels). The system may slide the trailer template over the sampled image that includes the warped region of interest 90 and determine a score for each position during the slide. The best score (e.g., the highest score) is chosen as the trailer position. The best score may indicate the best match between the trailer template and the warped region of interest 90 during the slide. This process may be repeated for all nine frames of captured image data, with each frame of captured image data having a different trailer angle/hitch position (and subsequent warped region of interest). The system may average the hitch ball position from each frame of captured image data. FIG. 10 illustrates an example of template matching between the trailer template and the captured frames of captured image data during the turn. Once the location of the hitch ball is determined after the template matching, the state of the system may transition to the scanning state.

Thus, implementations herein determine several important features or aspects of a hitched trailer via a calibration maneuver. The system may apply to a variety of applications, such as: rear-camera based trailer feature detection, hitch ball calculation, collision angle detection, trailer beam length estimation, and/or any application that requires tracking of objects moving around a pivot.

The system may utilize aspects of the trailering assist systems or trailer angle detection systems or trailer hitch assist systems described in U.S. Pat. Nos. 10,755,110; 10,733,757; 10,706,291; 10,638,025; 10,586,119; 10,532, 698; 10,552,976; 10,160,382; 10,086,870; 9,558,409; 9,446,713; 9,085,261 and/or 6,690,268, and/or U.S. Publication Nos. US-2020-0406967; US-2020-0356788; US-2020-0334475; US-2020-0361397; US-2020-0017143; US-2019-0297233; US-2019-0347825; US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873; US-2017-0050672; US-2015-0217693; US-2014-0160276; US-2014-0085472 and/or US-2015-0002670, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailering assist system for a vehicle, the vehicular trailering assist system comprising:

a camera disposed at a rear portion of a vehicle equipped with the vehicular trailering assist system, the camera viewing at least rearward of the vehicle, wherein, with a trailer hitched to the vehicle via a pivoting joint hitch connection of the trailer to the vehicle, the camera views at least a portion of the trailer hitched to the vehicle;

wherein the camera captures frames of image data that include image data representative of at least a portion of the trailer hitched to the vehicle;

an electronic control unit (ECU) comprising electronic circuitry and associated software;

wherein the electronic circuitry comprises an image processor operable to process frames of image data captured by the camera as the vehicle and trailer travel along a road;

wherein the ECU, responsive to processing of frames of image data captured by the camera during a calibration maneuver by the vehicle, determines an initial trailer template of the trailer hitched to the vehicle;

wherein the ECU, during a first portion of a turning portion of the calibration maneuver, and at least in part via processing of frames of image data captured by the camera during the turning portion of the calibration maneuver, stores a subset of the frames of image data captured by the camera, and wherein each stored frame of image data of the stored subset includes the trailer at a different trailer angle relative to a longitudinal axis of the vehicle;

wherein the ECU determines image data edges for each stored frame of image data;

wherein the ECU, responsive to determining image data edges for each stored frame of image data, matches each determined image data edge to the determined initial trailer template;

wherein the ECU, responsive to matching each determined image data edge to the determined initial trailer template, determines a location of a hitch ball of the vehicle;

wherein the ECU, after performing the first portion of the turning portion of the calibration maneuver and during a second portion of the turning portion of the calibration maneuver, determines a collision angle of the trailer, and wherein the collision angle represents a trailer angle of the trailer relative to the longitudinal axis of the vehicle where the trailer collides with the vehicle; and wherein, during the second portion of the turning portion of the calibration maneuver, the trailer angle of the trailer relative to the longitudinal axis of the vehicle remains constant.

2. The vehicular trailering assist system of claim 1, wherein the ECU captures the stored frames of image data during an angle sampling portion of the calibration maneuver.

3. The vehicular trailering assist system of claim 2, wherein, during the angle sampling portion of the calibration maneuver, the ECU determines a current trailer angle based on a kinematic model.

4. The vehicular trailering assist system of claim 2, wherein the angle sampling portion of the calibration maneuver completes after the vehicle completes a threshold portion of a turn of the calibration maneuver.

5. The vehicular trailering assist system of claim 1, wherein each stored frame of image data is cropped to encompass only a region of interest, and wherein the ECU matches the region of interest to the determined initial trailer template.

6. The vehicular trailering assist system of claim 1, wherein the ECU, while determining the location of the hitch ball of the vehicle, provides an indication to an operator of the vehicle.

7. The vehicular trailering assist system of claim 1, wherein the stored subset of stored frames of image data comprises less than ten stored frames of image data.

8. The vehicular trailering assist system of claim 1, wherein the ECU, using the image data edges, generates an edge image for each stored frame of image data, and wherein the ECU matches each generated edge image to the determined initial trailer template by determining a plurality of scores for each generated edge image and selecting the highest score for each generated edge image.

9. The vehicular trailering assist system of claim 8, wherein the ECU determines the plurality of scores for each generated edge image by sliding each corresponding generated edge image along the determined initial trailer template.

10. The vehicular trailering assist system of claim 8, wherein the score is associated with an amount of matching between the generated edge image and the determined initial trailer template.

11. The vehicular trailering assist system of claim 8, wherein each generated edge image comprises a warped region of interest.

12. A vehicular trailering assist system for a vehicle, the vehicular trailering assist system comprising:

a camera disposed at a rear portion of a vehicle equipped with the vehicular trailering assist system, the camera viewing at least rearward of the vehicle, wherein, with a trailer hitched to the vehicle via a pivoting joint hitch connection of the trailer to the vehicle, the camera views at least a portion of the trailer hitched to the vehicle;

wherein the camera captures frames of image data that include image data representative of at least a portion of the trailer hitched to the vehicle;

an electronic control unit (ECU) comprising electronic circuitry and associated software;

wherein the electronic circuitry comprises an image processor operable to process frames of image data captured by the camera as the vehicle and trailer travel along a road;

wherein the ECU, responsive to processing of frames of image data captured by the camera during a calibration maneuver by the vehicle, determines an initial trailer template of the trailer hitched to the vehicle;

wherein the ECU, during a first portion of a turning portion of the calibration maneuver, and at least in part via processing of frames of image data captured by the camera during the turning portion of the calibration maneuver, stores a subset of the frames of image data captured by the camera, wherein each stored frame of image data of the stored subset includes the trailer at a different trailer angle relative to a longitudinal axis of the vehicle;

wherein the ECU crops each stored frame of image data to encompass only a region of interest, wherein the region of interest comprises a location of a hitch ball of the vehicle, wherein the ECU matches the region of interest of each cropped frame of image data to the determined initial trailer template;

wherein the ECU determines image data edges for each stored frame of image data image data;

wherein the ECU, responsive to determining image data edges for each stored frame of image data, matches each determined image data edge to the determined initial trailer template;

wherein the ECU, responsive to matching each determined image data edge to the determined initial trailer template, determines the location of the hitch ball of the vehicle; and wherein the ECU, after performing the first portion of the turning portion of the calibration maneuver and during a second portion of the turning portion of the calibration maneuver, determines a collision angle of the trailer, and wherein the collision angle represents a trailer angle of the trailer relative to the longitudinal axis of the vehicle where the trailer collides with the vehicle; and wherein, during the second portion of the turning portion of the calibration maneuver, the trailer angle of the trailer relative to the longitudinal axis of the vehicle remains constant.

13. The vehicular trailering assist system of claim 12, wherein the ECU captures the stored frames of image data during an angle sampling portion of the calibration maneuver.

14. The vehicular trailering assist system of claim 13, wherein, during the angle sampling portion of the calibration maneuver, the ECU determines a current trailer angle based on a kinematic model.

15. The vehicular trailering assist system of claim 13, wherein the angle sampling portion of the calibration maneuver completes after the vehicle completes a threshold portion of a turn of the calibration maneuver.

16. The vehicular trailering assist system of claim 12, wherein the ECU, while determining the location of the hitch ball of the vehicle, provides an indication to an operator of the vehicle.

17. A vehicular trailering assist system for a vehicle, the vehicular trailering assist system comprising:

a camera disposed at a rear portion of a vehicle equipped with the vehicular trailering assist system, the camera viewing at least rearward of the vehicle, wherein, with a trailer hitched to the vehicle via a pivoting joint hitch connection of the trailer to the vehicle, the camera views at least a portion of the trailer hitched to the vehicle;

wherein the camera captures frames of image data that include image data representative of at least a portion of the trailer hitched to the vehicle;

an electronic control unit (ECU) comprising electronic circuitry and associated software;

wherein the electronic circuitry comprises an image processor operable to process frames of image data captured by the camera as the vehicle and trailer travel along a road;

wherein the ECU, responsive to processing of frames of image data captured by the camera during a calibration maneuver by the vehicle, determines an initial trailer template of the trailer hitched to the vehicle;

wherein the ECU, during a first portion of a turning portion of the calibration maneuver, and at least in part via processing of frames of image data captured by the camera during the turning portion of the calibration maneuver, stores a subset of the frames of image data captured by the camera, wherein each stored frame of image data of the stored subset includes the trailer at a different trailer angle relative to a longitudinal axis of the vehicle;

wherein the ECU determines image data edges for each stored frame of image data image data;

wherein the ECU, using the image data edges, generates an edge image for each stored frame of image data;

wherein the ECU determines a plurality of scores for each generated edge image;

wherein the ECU, responsive to determining the plurality of scores, matches each generated edge image to the determined initial trailer template;

wherein the ECU, responsive to matching each generated edge image to the determined initial trailer template, determines a location of a hitch ball of the vehicle;

wherein the ECU, after performing the first portion of the turning portion of the calibration maneuver and during a second portion of the turning portion of the calibration maneuver, determines a collision angle of the trailer, and wherein the collision angle represents a trailer angle of the trailer relative to the longitudinal axis of the vehicle where the trailer collides with the vehicle; and wherein, during the second portion of the turning portion of the calibration maneuver, the trailer angle of the trailer relative to the longitudinal axis of the vehicle remains constant.

18. The vehicular trailering assist system of claim 17, wherein the ECU determines the plurality of scores for each edge image by sliding each corresponding edge image along the determined initial trailer template.

19. The vehicular trailering assist system of claim 18, wherein the score is associated with an amount of matching between the edge image and the determined initial trailer template.

20. The vehicular trailering assist system of claim 17, wherein each generated edge image comprises a warped region of interest.

* * * * *